United States Patent Office 3,510,770
Patented May 5, 1970

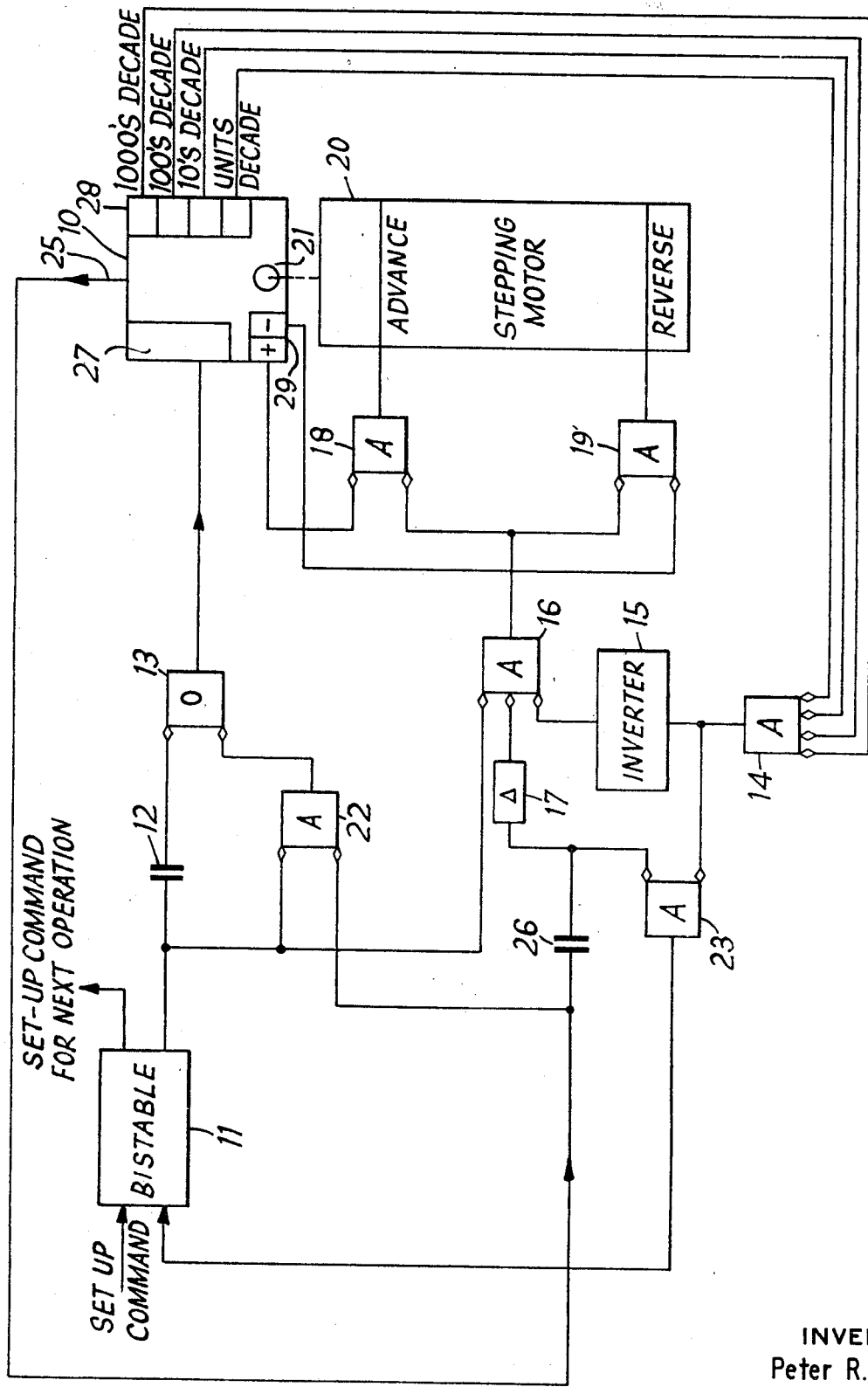

3,510,770
APPARATUS FOR THE AUTOMATIC CALIBRATION OF DIGITAL INSTRUMENTS
Peter Robert Lowe, Farnborough, England, assignor to The Solartron Electronic Group Limited, Farnborough, Hampshire, England, a corporation of the United Kingdom
Filed July 27, 1967, Ser. No. 656,494
Claims priority, application Great Britain, Aug. 2, 1966, 34,646/66
Int. Cl. G01r 1/02
U.S. Cl. 324—130        17 Claims

ABSTRACT OF THE DISCLOSURE

Apparatus for automatically calibrating digital instruments is described in which logic circuits set the instrument up for calibration, and signals corresponding to the digits of the instruments output reading are supplied to logic circuits. Unless all the digits are zero a stepping motor under the control of the logic circuits drives a control for correcting the calibration of the instrument, but when all the digits are zero the instrument is set for normal operation or further calibration operations.

---

The present invention relates to apparatus for effecting the automatic calibration of digital instruments.

Most digital instruments require calibration when first switched on and from time to time during use. A typical digital voltmeter requires three calibration operations: calibration against an internal standard cell, with the input voltage zero, and wih the input current zero. In the laboratory, these operations can be made reasonably quickly and easily but the responsibility for calibration rests completely with the operator who may not calibrate or may calibrate incorrectly. When manually-calibrated instruments are installed at a remote or unmanned location a visit must be made regularly to re-calibrate.

An object of the present invention is therefore to provide apparatus for the automatic calibration of digital instruments.

Another object of the present invention is to provide apparatus which calibrates accurately and therefore avoids human errors.

Yet another object of the present invention is to provide apparatus which can be installed with an instrument at a remote location and can be ordered to carry out calibration by sending a command signal.

Briefly this invention provides apparatus for effecting the automatic calibration of digital instruments. The apparatus includes a logic-control circuit for setting the instrument which is to be calibrated, either for normal operation or for calibration, in response to a command input signal applied to the logic-control circuit. A sensing or comparator circuit is provided for indicating whether the digital output reading of the instrument differs from, or is equal to, a predetermined reading. A calibration control device enabled by the logic-control circuit on receipt of a command input signal, is provided for so adjusting the instrument that any difference between the output reading and the predetermined reading is reduced. Additional circuitry provides a control input signal for the logic-control circuit when the said difference is reduced to zero, and causes the logic-control circuit to set the instrument for normal operation or, where another calibration operation is required, for initiating such an additonal calibration operation.

The adjustment of the instrument may take place as a series of steps after each of which the sensing circuit determines whether the said difference is, or is not, zero and hence whether or not a further adjustment is necessary.

In accordance with more specific aspects of the invention the logic-control circuit may include a bistable circuit which receives a command signal when calibration is to take place. A change of state of the bistable causes a signal to be passed to logic circuits ensuring that the instrument is on the correct range for calibration and its input terminals are connected as required. For example to effect instrument calibration with zero input current a one megohm resistor may be connected across the input terminals. Similarly to effect instrument calibration with a zero input voltage these terminals may be short circuited. When the bistable changes state in response to the command signal the instrument is given time to stabilize before providing an output reading.

The bistable may be so connected that when it changes state again, in response to an input signal indicating that the instruments output reading equals the predetermined reading, a second bistable for initiating a further calibration operation changes state, or, if there are no further calibration operations, the instrument is connected to read normally.

The sensing circuit for indicating whether the output readings differ from the predetermined reading may include a first AND gate, readings corresponding to each digit of the said difference being applied as inputs to this gate. Preferably the first AND gate is arranged to provide an output signal when all the digits are zero, that is to say, when the digital output of the instrument is all 0 bits.

An inverter may be coupled between the first AND gate and a second AND gate to provide an input signal for the second AND gate when output reading is not equal to the predetermined reading, or more specifically where a 1 bit appears in the instrument digital readout. Successive input signals for the second AND gate may be passed from the bistable circuit and from the instrument every time an output reading is provided. The second AND gate then opens when a new output reading is obtained and the bistable is in the state allowing calibration.

The second AND gate may provide input signals to third and fourth AND gates, another input for the third AND gate being provided by that part of the instrument which indicates when the digital readout is positive, and another input for the fourth AND gate being provided by that part of the instrument which indicates when the digital readout is negative. Thus the third AND gate opens when the readout is positive and the fourh AND gate opens when the readout is negative. A bidirectional stepping motor is provided to drive a calibration potentiometer which may for example be rotated in one of the two directions according to which of the third and fourth AND gates are opened.

A fifth AND gate is preferably coupled to the output of the first AND gate, and to the instrument so that a signal from this gate is provided when the output reading equals the predetermined reading of for example, all 0 bits. The signal from the fifth AND gate is applied to the bistable circuit causing it to change state and provide an indication that the calibration operation has been completed.

In some instruments the output reading may not automatically change when calibration is changed, and a further signal for the logic circuits may be required to obtain a new output reading. Means for providing further output readings may include a sixth AND gate having its output connected to part of the logic circuits initiating outputs signals, and inputs connected to the instrument and the bistable circuit. If the bistable circuit is in its calibrate state, that is if the bistable circuit has not been reset, and an output reading has just been provided then the sixth AND gate will open and a further output reading will be given.

An embodiment of the invention will now be described, by way of example, with reference to the accompanying drawing which is a block diagram of apparatus according to the invention.

Instruments which require calibration commonly have a switch which has to be set in a certain position when calibration is to be carried out. For example the switch may have three positions one for calibrating against a standard cell, one for voltage zero, and one for current zero. An instrument which is to be calibrated by apparatus according to the present invention may have logic circuits instead of the switch. These logic circuits may include a number of relays whose contacts are substituted for those of the switch. The logic circuits may then be connected to a switch at a remote location and operated when calibration is to be carried out, or signals operating the logic circuit as required may be sent from the remote location as part of a program which is carried out automatically.

In the drawing a digital voltmeter 10 has logic circuits 27 of the type described in the preceding paragraph enabling it to be set up for calibration when the apparatus shown in the drawing receives a command pulse, sent by an operator, or as part of a program. For example if the voltage zero is to be set the logic circuits would short circuit the input terminals of the voltmeter and in effect switch to the correct range for this calibration operation. The logic circuits then allow time for the meter to settle and to indicate a reading before causing the meter to change the level at an output connection 25. A capacitor 26 generates an adjust command pulse from the change of level.

When it is required to calibrate the voltmeter 10, a command pulse is applied to a bistable multivibrator circuit 11, causing the bistable to change from its normal state in which the voltmeter is set to take readings to a calibrate state. A capacitor 12 generates a pulse when the bistable to which it is coupled, changes its state and this pulse is passed by way of an OR gate 13 to the voltmeter 10. Thus the voltmeter is set-up for calibration and its multi-decade output counter 28 indicates a reading. When the meter is correctly calibrated the output reading shown by the counter is arranged to be all 0 bits, even when calibration against an internal standard cell is being carried out. The counter outputs are separately connected to the inputs of an AND gate 14 so that the output of this gate is at one level unless all the digits in the counter reading are zero when the output is at the other level.

If the AND gate 14 indicates that one, at least, of the digits of the counter reading is not zero an input is applied by way of an inverter 15 to an AND gate 16. The adjust-command pulse generated when the voltmeter indicated a reading, passed by way of a delay circuit 17 typically comprising a monostable circuit arrives at the gate 16 at the same time as the input from the gate 14. Since the third input for the gate 16 is also applied from the bistable circuit 11 in the calibrate state the gate opens and applies signals to two AND gates 18 and 19. A polarity indicator 29 which is part of the meter 10 and indicates the polarity of the output reading applies a signal to open the gate 18 if output in the voltmeter counter is positive, and the polarity indicator 29 applies a signal to open the gate 19 if this output is negative. The gates 18 and 19 are connected by way of a drive circuit (not shown) to a bidirectional stepping motor 20 coupled to drive a potentiometer 21 which is that control of the digital voltmeter 10 which enables the meter to be calibrated. Thus calibration is a matter of setting this potentiometer correctly. When the gate 18 opens the drive circuit applies currents in a particular sequence to the field windings of the stepping motor, causing the motor to advance and drive a potentiometer 21 in one direction. The motor drives the potentiometer in the other direction when the gate 19 opens since the drive circuit then applies currents in the opposite sequence to the field windings of the motor. The drive circuit may be two series of relays each series being connected to provide one of the required current sequence. Alternatively the drive circuits may include two bistable circuits which are interconnected by way of AND gates to provide the required current sequences on receipt of signals from AND gates 18 or 19.

The receipt of a pulse from the voltmeter 10 at an AND gate 22 causes a signal to be passed by way of the OR gate 13 to the voltmeter provided the bistable circuit 11 is in its calibrate state. Thus after time for allowing the voltmeter to stabilize has again passed another output reading is applied to the gate 14 and another pulse is emitted from the gate 14 if the digital output from the voltmeter does not contain all 0 bits for example.

When all the digits of an output reading are zero the AND gate 14 applies an enabling signal to an AND gate 23 so that when the next adjust command pulse from the voltmeter 10 is applied to this gate, a pulse passes through the gate 23 and is received by the bistable circuit 11 which changes its state in response thereto. The AND gate 22 now remains closed and no further pulses are emitted from the voltmeter. The AND gate 16 also remains closed and movement of the stepping motor is prevented, so locking the potentiometer in position, provided there is sufficient friction to prevent the motor and the potentiometer from moving. Movement is also prevented by breaking the power supply connection to the motor when calibration is completed. In this way the calibration information stored by the position of the motor is not destroyed when the instrument is switched off, and no power is used by the motor when readings are being taken by the instrument.

The bistable circuit 11 may be connected to another bistable circuit (not shown) which controls a circuit similar to the circuit of the figure. When the potentiometer 21 has been set and the bistable circuit 11 changes state the other bistable receives a command signal and the next calibration operation takes place. The bistable circuit initiating the last calibration operation sets up the voltmeter 10 for normal readings when this last operation is completed. Of course if there is only one calibration operation, the bistable circuit corresponding to the circuit 11 resets the instrument to normal operation.

Where there are several circuits of the type shown in the figure some parts may be shared. For example the gates 14, 16 and 23, the inverter 15 and the delay circuit 17 may be shared provided the output of the gate 16 is connected through a further AND gate (not shown) allowing only the appropriate bistable circuit to change state after each calibration operation.

Excellent isolation between earth and "floating" measuring circuits in the instrument may be obtained by suitable choice of the coupling between the motor 20 and the potentiometer 21, for example a nylon shaft could be used. Any backlash in this coupling does not affect the accuracy of calibration, but only the time required for calibration.

While there has been described what is at present considered to be a preferred embodiment of this invention, it will be obvious to those skilled in the art that various changes and modifications may be made therein without departing from the invention, and its is, therefore, intended to cover all such changes and modifications as fall within the true spirit and scope of the invention.

What is claimed is:

1. Apparatus for automatically calibrating different ones of a plurality of digital instruments, each instrument providing a plural-binary digit output, the apparatus comprising, logic-control means, adapted to be coupled to an instrument which is to calibrated, for conditioning said instrument for calibration in response to a command signal applied to said logic-control means, means adapted to be coupled to the output of said instrument for determining whether the output of said instrument, in binary form, differs from a predetermined binary value, calibration-control means coupled to said sensing means and adapted to be coupled to said instrument, for adjusting said instrument to reduce to predetermined values differences between said binary output and said predetermined binary value, said calibration control means also being coupled to said logic-control means and being activated thereby when said logic-control means receives a command signal, and means coupled to said logic-control means and responsive to said binary output equalling said predetermined binary value for signalling said logic-control means to terminate the calibration of said instrument and to initiate the calibration of another and similar digital instrument.

2. Apparatus for the automatic calibration of at least one digital instrument, wherein said digital instrument includes a digital output circuit, logic-control means coupled to said instrument for conditioning said instrument for calibration in response to a command input signal applied to said logic-control means, sensing means coupled to said digital output circuit for determining whether the digital output of said circuit differs from a predetermined digital value, calibration-control means of an analog type coupled to said sensing means, and to said instrument for adjusting said instrument to reduce any difference between said output and said predetermined value, said calibration control means also being coupled to said logic-control means and being initiated thereby when said logic-control signal receives an input command signal, and means coupled to said logic-control means for providing a control signal when said digital output of said digital output circuit equals said predetermined digital value, whereupon said logic-control means provides an output-control signal for terminating calibration of said instrument.

3. Apparatus for the automatic calibration of a digital instrument, including, a digital instrument having a digital output circuit and a control for adjusting the calibration thereof, logic-control means coupled to said instrument for conditioning said instrument for calibration in response to a command input signal applied to said logic-control means, sensing means coupled to said digital output circuit for indicating whether the binary output from said circuit differs from a predetermined binary value, calibration-control means including means for driving said control of said instrument so as to adjust said instrument when said control means is operated to nullify magnitude differences between said binary output and said predetermined binary value, said calibration control means also being coupled to said logic-control means and being operated thereby when said logic-control means receives an input command signal, and means coupled to said logic-control means for providing an output-control signal when the binary value of said output equals said predetermined binary value, said output-control signal being applied to said digital instrument to terminate the calibrating adjustment thereof.

4. Apparatus according to claim 3 wherein, said means for driving said control of said instrument is a stepping motor.

5. Apparatus according to claim 3 wherein said logic-control means is further coupled to said instrument to cause said instrument to be conditioned for a further calibration operation on receipt of said output-control signal.

6. Apparatus according to claim 3 wherein said logic-control means is further coupled to said instrument to cause said instrument to revert to normal operation on receipt of said output-control signal.

7. Apparatus according to claim 6, wherein said instrument has a plurality of output terminals, one for each digit of its output, each of said terminals receiving a binary signal of magnitude determined by the magnitude of the corresponding digit, and said sensing means includes a first AND gate having a number of input terminals one for each of said output terminals and separately coupled thereto, said first AND gate opening when said output equals said predetermined value and causing calibration to cease.

8. Apparatus according to claim 7, wherein the predetermined value is binary zero, and said first AND gate opens when all said digits, and hence the magnitudes of all signals applied to said input terminals of said first AND gate, are representable as binary zeros.

9. Apparatus according to claim 7, wherein
said logic control means provides a first enabling signal during calibration,
said instrument provides a second enabling signal whenever its output changes, and said calibration control means includes
an inverter, and
a second AND gate having a first input terminal coupled, by way of said inverter, to the output of said first AND gate, a second input coupled to said logic-control means to receive said first enabling signal, and a third input coupled to said instrument to receive said second enabling signal, whereby said calibration means is enabled only during calibration and when instrument provides a new output reading.

10. Apparatus according to claim 9, wherein
said instrument has a rotary member which when rotated varies the calibration thereof, and
said calibration-control means includes,
third and fourth AND gates, each having two input terminals one of which is connected to the output of said third gate,
first means coupled to the other input of said third AND gate for providing a signal tending to close said third AND gate when said output of said instrument is greater than said predetermined value,
second means, coupled to the other input of said fourth AND gate, for providing a signal tending to close said fourth AND gate when said output of said instrument is smaller than said predetermined value, and
a stepping motor, coupled to said third and fourth AND gates, to step in one direction when said third AND gate is open, and in the other direction when said fourth AND gate is open, said motor being coupled to rotate said rotary member.

11. Apparatus according to claim 6, including logic means which on receipt of an input pulse sets said instrument for calibration, and, where necessary, connects a predetermined impedance between input terminals of said instrument, and wherein
said logic-control circuit includes a bistable circuit having two output terminals, one of which is coupled to said logic means, said bistable circuit generating said input pulse when changing from one of its states to the other.

12. Apparatus according to claim 11 wherein
said instrument has a number of output terminals, one for each digit of its output, each of said terminals receiving a signal of magnitude dependant on the corresponding digit, and
said sensing means includes a first AND gate having a number of input terminals one for each of said output terminals and separately coupled thereto, said first AND gate opening when said output equals said predetermined value and causing calibration to cease.

13. Apparatus according to claim 12 wherein
the predetermined value is zero, and
said first AND gate opens when all said digits, and hence the magnitudes of all signals applied to said input terminals of said first AND gate, are zero.

14. Apparatus according to claim 13, wherein
said bistable circuit provides a first enabling signal when in said other state, said instrument provides a second enabling signal whenever its output changes, and said calibration control means include
an inverter, and
a second AND gate having a first input terminal coupled, by way of said inverter, to the output of said first AND gate, a second input coupled to said bistable circuit to receive said first enabling signal, and a third input coupled to said instrument to receive said second enabling signal, whereby said calibration means is enabled only during calibration and when a said instrument provides a new output reading.

15. Apparatus according to claim 14, wherein
said instrument has a rotary member which when rotated varies the calibration thereof, and
said calibration-control means includes,
third and fourth AND gates, each having two input terminals one of which is connected to the output of said third gate,
first means, coupled to the other input of said third AND gate for providing a signal tending to close said third AND gate when said output of said instrument is greater than said predetermined value,
second means, coupled to the other input of said fourth AND gate, for providing a signal tending to close said fourth AND gate when said output of said instrument is smaller than said predetermined value, and
a stepping motor, coupled to said third and fourth AND gates, to step in one direction when said third AND gate is open, and in the other direction when said fourth AND gate is open, said motor being coupled to rotate said rotary member.

16. Apparatus according to claim 15, wherein
said logic means provides a third enabling pulse on receipt of said input pulse, and
said logic-control means includes a fifth AND gate having a first input coupled to the output of said first AND gate, and a second input coupled to said logic means to receive said third enabling pulse, said fifth AND gate having an output coupled to said bistable circuit to change the state thereof when said fifth AND gate is open, whereby calibration is terminated when said output equals said predetermined value.

17. Apparatus according to claim 11, wherein
said logic means cause said instrument to provide a new output, on receipt of said input pulse,
said instrument generates an enabling pulse when a new output is provided, and
said logic-control means includes a sixth AND gate having a first input coupled to said instrument to receive said enabling pulse, and a second input coupled to said one terminal of said bistable circuit, said sixth AND gate having an output terminal connected to said logic means to initiate a new output from said instrument, whereby said instrument provides a series of outputs during calibration.

References Cited

UNITED STATES PATENTS

| | | | |
|---|---|---|---|
| 3,105,230 | 9/1963 | McIntyre | 340—347 |
| 3,148,366 | 9/1964 | Schulz | 340—347 |
| 3,223,991 | 12/1965 | Dosch et al | 340—347 |
| 3,366,948 | 1/1968 | Price | 340—347 |

RUDOLPH V. ROLINEC, Primary Examiner

E. F. KARLSEN, Assistant Examiner

U.S. Cl. X.R.

340—347